United States Patent [19]

Duncan

[11] Patent Number: 4,839,123

[45] Date of Patent: Jun. 13, 1989

[54] PROCESS OF APPLYING A SILICONE RELEASE COATING TO AN ORIENTED POLYMER FILM

[75] Inventor: Gary L. Duncan, Fairport, N.Y.

[73] Assignee: Mobil Oil Corporation, New York, N.Y.

[21] Appl. No.: 897,580

[22] Filed: Aug. 18, 1986

[51] Int. Cl.⁴ ............................................. B29C 47/06
[52] U.S. Cl. .................. 264/22; 156/244.11; 264/154; 264/171; 264/210.2; 264/236; 264/288.8; 264/290.2; 264/300
[58] Field of Search ................. 264/171, 288.8, 290.2, 264/41, 300, 154, 210.2, 22, 236; 156/244.11, 229

[56] References Cited

U.S. PATENT DOCUMENTS

| | | |
|---|---|---|
| 3,726,710 | 4/1973 | Berger et al. |
| 3,850,786 | 11/1974 | Jeffries et al. |
| 4,035,218 | 7/1977 | Yount |
| 4,070,526 | 1/1978 | Colquhoun et al. |
| 4,201,808 | 5/1980 | Cully et al. |
| 4,256,870 | 3/1981 | Eckberg |
| 4,262,107 | 4/1981 | Eckberg |
| 4,279,717 | 7/1981 | Eckberg et al. |
| 4,339,485 | 7/1982 | Shibano et al. |
| 4,340,647 | 7/1982 | Eckberg |
| 4,347,646 | 9/1982 | Staudenrausch |
| 4,348,454 | 9/1982 | Eckberg |
| 4,377,616 | 3/1983 | Ashcraft et al. |
| 4,379,806 | 4/1983 | Korpman ........................ 264/171 |
| 4,419,410 | 12/1983 | Weiner |
| 4,423,100 | 12/1983 | Witman ........................... 264/300 |
| 4,454,266 | 6/1984 | Coughlan et al. ............... 264/300 |
| 4,518,654 | 5/1985 | Eichbauer et al. .............. 264/171 |
| 4,559,396 | 12/1985 | Sasaki et al. |
| 4,559,938 | 12/1985 | Metcalfe .......................... 264/41 |
| 4,576,999 | 3/1986 | Eckberg |
| 4,578,316 | 3/1986 | Clauson et al. ............. 156/244.11 |
| 4,652,489 | 3/1987 | Crass et al. .................. 264/290.2 |
| 4,664,866 | 5/1987 | van der Heijden ............ 264/171 |
| 4,702,874 | 10/1987 | Ohara et al. .................... 264/300 |

*Primary Examiner*—Jeffery Thurlow
*Attorney, Agent, or Firm*—Alexander J. McKillop; Charles J. Speciale

[57] ABSTRACT

A process is disclosed for making an oriented polymer film product which comprises:
(a) applying a solventless, curable silicone release composition to an extrudable, orientable polymer;
(b) extruding the polymer as a sheet or film;
(c) orienting the sheet or film such that curable silicone release composition migrates to at least one surface of the sheet or film forming a substantially continuous layer thereon; and
(d) subjecting the oriented sheet or film to silicone-curing conditions whereby said curable silicone release composition forms a substantially continuous release layer thereon.

6 Claims, No Drawings

PROCESS OF APPLYING A SILICONE RELEASE COATING TO AN ORIENTED POLYMER FILM

BACKGROUND OF THE INVENTION

This invention relates to a curable silicone release coating, to a process for applying such a coating to an oriented polymer film and, in particular, to a coextruded, pressure sensitive, oriented polymeric label stock product possessing an integral release layer obtained by the process.

Silicone compositions have long been used as release coatings for rendering a surface or material relatively nonadherent to other materials which would normally adhere thereto. For example, silicone release compositions have found application as coatings which release pressure-sensitive adhesives for labels, decorative laminates, transfer tapes, etc. Silicone release coatings on paper, polyethylene, polypropylene and many other kinds of films are also useful for providing nonadherent surfaces for food handling and industrial packaging.

One method of producing silicone-coated release papers involves first forming a curable release composition consisting of (1) a hydroxy end-blocked dimethylsiloxane gum stock; (2) a crosslinking agent such as a siloxane fluid containing silicon-bonded hydrogen units (Si—H), (3) a catalyst such as a metal salt of a carboxylic acid and (4) an organic solvent such as xylene. The composition is then applied to the paper substrate in the form of a coating and the coated substrate is heated mildly to drive off the solvent. After the solvent has been removed the siloxane composition on the substrate is cured at relatively high temperatures, e.g., 100° C. to 150° C., to crosslink the siloxane gum and form the desired release paper product.

In order to dispense with the need for a solvent, in recent years a variety of solventless curable silicone release compositions have been developed which are readily curable at relatively low temperature, by light radiation or by some other form of radiation. Illustrative of such silicone release compositions are those described in U.S. Pat. Nos. 3,726,710; 4,070,526; 4,201,808; 4,256,870; 4,262,107; 4,279,717; 4,340,647; 4,347,646; 4,348,454; and 4,576,999, the disclosures of which are incorporated by reference herein.

In the conventional manufacture of pressure sensitive adhesive labels, a solution of a pressure sensitive material is applied to a substrate, or face stock, usually paper, in the form of a continuous web and dried. Thereafter a release sheet, usually provided as a continuous paper web coated with a release agent as described above, is applied to the exposed pressure sensitive adhesive surface to form a substrate-pressure sensitive adhesive-release sheet label stock which is then wound on a rewind roll for further processing such as sheeting, slitting or other conversion. After that, the label stock is typically printed, cut and collated by a printer to form individual printed sheets. Such sheets may be utilized for any number of uses including name tags, stickers, labels, etc., by simply peeling away the release paper and pressing the adhesive-coated side of the face sheet to the desired surface.

U.S. Pat. No. 4,582,736 and 4,626,460 the disclosures of which are incorporated by reference herein, each describes a biaxially oriented coextruded label stock material which comprises: (a) a facing layer in the form of a polyolefin film having an upper surface and a lower surface, and preferably one containing a quantity of opacity-producing voids in accordance with the teachings of U.S. Pat. No. 4,377,616, a pressure sensitive adhesive component incorporated within said facing layer or applied as a coating to the lower surface thereof; and (b) a release layer in the form of a polyolefin film having an upper surface and a lower surface and having a release agent component for the pressure sensitive adhesive component of facing layer (a) incorporated therein or applied as a coating to the upper surface thereof, the lower surface of facing layer (a) being peelably affixed to the upper surface of said release layer (b). The release agent can be incorporated into the polymer constituting release layer (b) prior to extrusion as it will tend to concentrate at the surfaces of this layer following orientation. Alternatively, the release agent can be applied to the surface of release layer (b) in a separate operation. Release agents mentioned in U.S. Pat. No. 4,582,736 and U.S. patent application Ser. No. 814,693 include silicones and modified silicones, the modification including both copolymerization of silicones with other non-release chemical agents or by adding non-silicone materials to a silicone coating solution prior to surface application of the release agent to the release layer. Other release agents indicated as useful include polyethylene, fluorocarbon, the Werner type chromium complexes and polyvinyl octadecyl carbamate.

SUMMARY OF THE INVENTION

It is a particular object of the present invention to provide a pressure sensitive label stock material manufactured entirely from synthetic resin components in a single coextrusion operation employing conventional equipment.

It is a further object of the invention to provide an oriented label stock product possessing a facing layer having a pressure sensitive adhesive material applied thereon or incorporated therein coextruded with, and peelably affixed to, a release layer having a solventless curable silicone release material incorporated therein.

In keeping with the foregoing objects, there is provided a process for making an oriented polymer film product which comprises:
  (a) incorporating a solventless, curable silicone release composition into an extrudable, orientable polymer;
  (b) extruding the polymer as a sheet or film;
  (c) orienting the sheet or film such that curable silicone release composition migrates to at least one surface of the sheet or film forming a substantially continuous layer thereon; and,
  (d) subjecting the oriented sheet or film to silicone-curing conditions whereby said curable silicone release composition forms a substantially continuous release layer thereon.

Further in aocordance with the present invention there is provided a process for making an oriented polymeric label stock product which comprises:
  (a) coextensively and adherently joining opposing surfaces of
  (1) a coextruded facing layer provided as an orientable polymer film having an upper surface and a lower surface and possessing a pressure sensitive adhesive component applied to the lower surface as a substantially continuous coating thereon or, optionally, containing a pressure sensitive adhesive component which is capable of migrating to the lower surface of the film following the orientation thereof whereby a substantially continuous layer of pressure sensitive adhesive component will form on said lower surface of the film, and (2) a coextruded release layer provided as an orientable polymer film having a upper surface and a lower surface and containing a solventless, curable silicone release component capable of migrating to the upper surface of the film following the orientation thereof whereby a substantially continuous layer of curable silicone release component will be formed on said upper surface of the film to provide a laminate structure;

(b) orienting the laminate structure resulting from step (a) whereby pressure sensitive adhesive component optionally contained in facing layer (1) migrates to the lower surface thereof forming a substantially continuous layer of pressure sensitive adhesive thereon and curable silicone release component contained in release layer (2) migrates to the upper surface of release layer (2) forming a substantially continuous layer of curable silicone release component thereon; and, (c) subjecting the oriented laminate structure resulting from step (b) to silicone-curing conditions whereby said curable silicone release component forms a substantially continuous release layer (2) in adjacent contact with the substantially continuous layer of pressure sensitive adhesive formed on the lower surface of facing layer (1).

DESCRIPTION OF THE PREFERRED EMBODIMENTS

Although the present invention is applicable to any oriented polymer film which is to be provided with a release coating on one or both surfaces thereof, it will now be more particularly described in connection with the manufacture of an oriented coextruded polyolefinic pressure sensitive label stock material possessing an integral release layer.

The polyolefins contemplated as facing layer (1) and/or release layer (2) of the subject film structure include polyethylene, polypropylene, polybutene and copolymers and blends thereof. An isotactic polypropylene containing at least 80% by weight of isotactic polypropylene and having a melt flow index of from about 4 to 8 g/10 minutes is advantageously used for both layers Facing layer (1) can itself be a laminate of two or more thermoplastic films where particular effects are desired. One such laminate, the opaque biaxially oriented polymer film structure of U.S. Pat. No. 4,377,616, the contents of which are incorporated by reference herein, is especially preferred for facing layer (1) herein as it imparts a lustrous appearance to the finished product In this emoodiment, facing layer (1) further contains, prior to biaxial orientation, a quantity of void-initiating microspheres which, following orientation, give rise to voids imparting the opaque, lustrous appearance referred to. In this embodiment, the upper surface of facing layer (1) is provided with a relatively thin void-free thermoplastic layer, designated skin layer (1)(ii), to hide or disguise surface imperfections in the underlying opaque void-containing layer, designated substrate layer (1)(i).

The upper, i.e., exposed, surface of skin layer (1)(ii) can be one which possesses, or which has been treated to possess, good receptvity for inks, writing, etc., thereon. The thermoplastic resin constituting skin layer (1)(ii) is also preferably fabricated from a material which also acts as a barrier to pressure sensitive adhesive component which may have been incorporated into the resin of substrate film (1)(i).

In order to achieve the lustrous satin appearance of the laminate constituting the preferred embodiment of facing layer (1) of the present invention, it is important that a particular thickness relationship exist between the thickness dimension of substrate layer (1)(i) and the thickness dimension of skin layer (1) (ii). It is preferred that the thickness be from about 30 to about 85% of the overall structure. This, in combination with the population and configuration of the voids in a structure of at least about 0.5 mils thick, will materially contribute to the overall degree of opacity of the structure. Likewise, by maintaining the thickness of skin layer (1)(ii) within a particular range in relation to the overall thickness of facing layer (a) and to the thickness of substrate layer (1)(i), the overall combination will exhibit a lustrous satin appearance. It is preferred that the thickness of skin layer (1)(ii) constitute from about 15 to about 70% of the total thickness of facing layer (1). It is important that skin layer (1)(ii) be sufficiently thick so that its outer surface will not manifest the rough texture or surface irregularities of underlying substrate layer (1)(i). If this were not the case, the lustrous satin-like appearance of skin layer (1) would be significantly lessened It is preferred that the average diameter of the void-initiating particles contained within substrate layer (1)(i) be from about 0.1 to about 10 microns. These particles should be approximately spherical in shape so as to initiate the formation of voids of unusual regularity and orientation in a stratified relationship throughout the matrix material following biaxial orientation of the entire coextruded product. This does not mean that every void must be the same in size. It means, generally speaking, that the voids will be of similar shape even though they may vary in their dimensions because they are all initiated by a substantially spherical particle. Ideally, all of the voids possess a shape defined by two opposed and edgecontacting concave disks.

Optimum characteristics of opacity and satin-like appearance are obtained when the two average major void dimensions are greater than about 30 microns.

As indicated above, the void-initiating particle material should be incompatible i.e., immiscible, with the polymer of substrate layer (1)(i) at least at the temperature of orientation.

Substrate layer (1)(i) has been described above as a thermoplastic polymer material within which is located a strata of voids. From this it is to be understood that the voids create the matrix configuration. The term "strata" is intended to convey the understanding that there are a large number of voids creating the matrix and the voids themselves are oriented so that the two major dimensions are aligned in correspondence with the direction of orientation of the polymeric film structure After each void has been formed, void-initiating particles may contribute little else to the substrate layer. This is because its refractive index can be close enough to that of the matrix material that it makes no contribution to opacity. When this is the case, opacity is principally a result of the light scattering effect brought about by the existence of the voids. The opacity of the substrate layer can be increased somewhat by incorporating an opacifying pigment therein. Titanium dioxide and zinc oxide are representative of such opacifying pigments. A particularly preferred proportion of pigment in substrate layer 1(i) can be from about 1% to about 3% by weight of this layer. The particle size and shape of the pigment material is such that it does not bring about any significant amount of void formation. The optional presence of such an opacifying pigment contributes perhaps 3 to 8% to the degree of opacity of the system.

A typical void in substrate layer (1)(i) may be defined as having major dimensions X and Y and minor dimension Z where dimension X is aligned with the machine direction orientation, dimension Y is aligned with the transverse direction orientation and dimension X approximately corresponds to the cross-sectional dimension of the spherical particle which initiated the void. It is a necessary part of the present invention that orientation conditions be such that the X and Y dimensions of the voids present in the substrate layer be major dimensions in comparison to the Z dimension. Thus, while the Z dimension generally approximates the cross-sectional dimension of the spherical particle initiating the void, the X and Y dimensions must be significantly greater. In addition, the orientation conditions must be such that the general integrity of the voids is maintained. By this, it is meant that during the orientation which produces the X and Y dimensions, that is, either by simultaneous or sequential machine direction and transverse direction stretching, the temperature conditions must be such as to permit these major dimensions to form without any destructure of the voids in any of their dimensions. The voids are particularly vulnerable to destruction during sequential orientation if the stretching temperature is too low. Even in simultaneous orientation, if the temperature is too low the stretching forces will tend to cause internal shredding and void splitting. This leads to a complete loss of control over the integrity of the individual closed voids and as a consequence, a deterioration in the integrity of the matrix polymer. Thus, one skilled in the art following the present general guidelines can orient at a temperature and to a degree which will yield Z and Y dimensions approaching a maximum without causing any substantial amount of splitting, shredding or overall lack of void and matrix integrity.

By way of illustration, room temperature biaxial orientation of a polypropylene matrix containing polybutylene terephthalate spheres of the size and amount contemplated herein will not produce the structure constituting facing layer (1) herein. Either void splitting will occur or voids of insignificant size will result. Polypropylene must be oriented at a temperature which happens to be significantly higher than its glass transition temperature. The temperature conditions must permit X and Y to be at least several multiples of the Z dimension without causing any appreciable amount of void splitting. When this is accomplished, optimum physical characteristics including low water vapor transmission rates and a high degree of light scattering are btained without significant void splitting or film fibrillating.

As indicated above, the matrix polymer and the void initiating particle contained therein must be mutually incompatible, which is to say, they must maintain two distinct phases under the conditions of biaxial orientation selected. The spherical void-initiating particles constitute a dispersed phase within the lower melting matrix polymer which polymer will, upon orientation, become a void-filled matrix with the spherical particles positioned somewhere within the voids.

It is believed that because of the comparative sphericity of the void-initiating particles, the voids are closed cells. This means that there is virtually no path open from one side of the substrate to the other through which liquid or gas can traverse.

The void-initiating particles can be organic or inorganic so long as they are spherical in shape and within the preferred particle size range so as to initiate the formation of a void, which in a significant number of cases, has a lens-like shape, that is, a lens of the biconvex shape Even a polymeric material can be used as the void-initiating particle provided it is one which can be co-melted with the polymer of the matrix or substrate. In this case, it is necessary for it to give a sufficiently higher melting point than the substrate polymer and be incompatible and capable of assuming a dispersed phase of small spherical particles as the temperature of the co-melted mix is reduced. It is also contemplated that the void-initiating particles can be preformed and then uniformly dispersed into a melt, e.g., one of polypropylene. This has the advantage of not subjecting the matrix polymer to the temperature of a much higher melting polymer. In this manner, any thermal degradation of the matrix polymer is avoided.

It is believed that because of the number, shape and orientation strata-wise of the voids, a significantly enhanced light scattering effect is obtained This effect is further enhanced or magnified by the use of the skin layer of the size relationship mentioned above. Skin layer (1)(ii) can optionally contain an opacifying pigment, e.g., titanium dioxide to further augment the degree of opacity of facing layer (1).

When preformed spheres are employed, it is the shape and size of the spheres that are important to the practice of this invention rather than their chemical composition. Solid or hollow organic or inorganic spheres of any type can be employed. Interesting effects can be achieved by the use of spheres of different colors. Since statistically each void has approximately one sphere somewhere within the void, interesting and pleasing color and/or reflectance effects can be imparted to the overall facing layer structure by the use of spheres of different color absorption or reflectance characteristics. The light scattered in a particular void is additionally either absorbed or reflected by the void-initiating sphere and a separate color contribution is made to the light scattering in each void.

Thermoplastic resins which can be employed as the dispersed phase within the matrix material include polyesters such as polybutylene terephthalate, polyamides, acrylic resins, etc. Polybutylene terephthalate (PBT) is especially preferred. Inorganic materials include solid or hollow preformed glass spheres, metal beads or spheres, ceramic spheres, etc. In fact, any material which can be formed into spheres but does not cause thermal degradation of the matrix material is within the scope of this invention.

Employing the polymer film structure of U.S. Pat. No. 4,377,616 as facing layer (1), light transmission through this layer can be reduced to as low as about 16 percent. Such would be the case with a film having an overall thickness of at least 1.5 mils where the thickness of substrate layer (1)(i) of the overall product is at least .60 percent with the thickness of skin layer (1)(ii) and release layer (2) each contributing about 20 percent to the overall thickness.

While the preferred particle size of the sphere is to be from about 0.1 to about 10 microns, it is particularly preferred that the particle size range from about 0.75 to about 2 microns. The void-initiating particles can be present in up to about 20 percent by weight of the core layer prior to orientation, a preferred range being from about 2 to 7 percent by weight For convenience and more precise control of the formulation and character of substrate layer (1)(i), a master batch technique can be employed either in the case of forming the spherical particles in situ or in adding preformed spheres to the molten substrate matrix material. After the formation of a master batch, appropriate dilution of the batch can be accomplished by adding additional thermoplastic substrate matrix material until the desired proportions are obtained.

As previously stated, it is preferred that substrate layer (1)(i), skin layer (1)(ii) and release layer (2) be coextruded. Thereafter, biaxial orientation is carried out to an extent and at a temperature calculated to obtain the maximum degree of opacity without any significant sacrifice in the physical characteristics and appearance of the film structure. As is evident, as the materials employed change, the conditions of biaxial orientation will change. By way of exemplification, when polybutylene terephthalate is used as the material of the void-initiating spheres, a machine direction orientation of from 4 to 8 times and a transverse direction orientation of from about 4 to 8 times at a drawing temperature of from 100° C. to 160° C. yields a biaxially oriented pressure sensitive label stock product of from 0.7 to 3 mils overall thickness.

The pressure sensitive adhesive component in facing layer (1)(ii) generally comprises a normally non-tacky elastomer, e.g., natural and/or synthetic rubbers, butadiene-styrene rubbers, polyisobutylene rubbers, isopolybutadiene rubbers, ethylene-propylene terpolymer rubbers, polyacrylic rubbers, polyvinyl ether rubbers, butadiene-acrylonitrile rubbers, butadiene-styrene-acrylonitrile rubbers, butadiene-styrene-acrylonitrile rubbers, butyl rubbers, etc., in combination with a tacky or tackifying resin, e.g., a rosin ester, a hydrogenated rosin ester, the glycerol ester of hydrogenated rosin, a polyterpene resin, a coumaroneindene resin, crude rubber, a polyisobutylene or other unsaturated hydrocarbon resin, a phenolated terpene, a petroleum resin, etc. The pressure sensitive adhesive may also contain additives such as anti-oxidants, fillers and the like. As previously indicated, the pressure sensitive adhesive can be incorporated into the polymer constituting the material from which facing layer (1)(i) is fabricated so that following orientation of the layer, the adhesive will migrate toward the surfaces thereof. Optionally, and preferably in some cases, the pressure sensitive adhesive is applied as a continuous coextruded layer directly to the lower surface of facing layer (1)(i).

Essentially any solventless, curable silicone release composition which is capable of migrating to the surface of release layer (2) following the orientation thereof can be employed herein. Especially suitable are the solventless, curable silicone release compositions and curing conditions described in U.S. Pat. Nos. 3,726,710; 4,070,526; 4,201,808; 4,256,870; 4,262,107; 4,279,717; 4,340,647; 4,347,646; 4,348,454; and, 4,576,999 referred to above. When the label stock film structure of this invention is entirely transparent or, at the very least, when the release layer supporting the curable silicone release agent is transparent, photocurable silicone release compositions can be utilized herein. However, when the entire label stock film structure is opaque, it is generally preferred to employ a silicone release composition which is curable by exposure to high energy radiation such as electron beams, X-rays, gamma-rays and beta-rays utilizing known equipment and procedures, e.g., those described in aforesaid U.S. Pat. Nos. 4,070,526 and 4,201,808.

The invention contemplates the use of conventional or otherwise known amounts of pressure sensitive adhesive and silicone release material The optimum amounts of these components employed will, of course, depend on the nature of the polymer materials involved, the characteristics of the adhesive and release materials and other factors readily appreciated by those skilled in this art.

Ordinarily, following orientation of a polymer film, curable silicone release composition will migrate to both surfaces of the film in approximately equal amounts. Where it is desired to influence the migration of the curable silicone release composition such that more of the composition will preferentially migrate to one surface of the film than the other, the teachings of U.S. Pat. No. 4,419,410, the contents of which are incorporated by reference herein, can be followed to advantage. Thus, for example, when it is desired to obtain more curable silicone release component on, say, the upper surface of a polymer film fabricated from a highly crystalline (i.e., isotactic) polypropylene compared to the upper surface of the film, said film can be provided on its upper surface with a relatively thin layer of resin of comparatively low stereoregularity such as an ethylene-propylene copolymer containing a small percentage of copolymerized ethylene, e.g., about 3% ethylene by weight. In such a structure, the curable silicone release component will tend to preferentially migrate toward the upper surface of the film possessing the thin layer of resin of low stereoregularity. In the label stock material herein, the same principle can be utilized in obtaining a higher concentration of pressure sensitive adhesive material on the lower surface of facing layer (1).

Regardless of whether a polymer film surface has been modified in accordance with the process of U.S. Patent No. 4,419,410 to promote preferential migration of a material incorporated therein to a particular surface, the surface of the film which does not require the presence of the component can be provided with a thin barrier layer to prevent or block the exudation of migrating component to its surface.

The following examples are further illustrative of the invention.

EXAMPLE 1

A mixture of isotactic polypropylene (83 parts, MP 160° C. and a melt index of 4.5), PBT (6 parts, MP 227oC) is melted in a first extruder provided with a sorew of L/D ratio of 20:1 to provide substrate layer (1)(i) of faoing layer (1). A second extruder in association with the first is provided with extrudable pressure sensitive adhesive made up of a 1:2 weight part mixture of styrene-butadiene rubber and rosin derivative. This second extruder coextrudes a layer of the pressure sensitive adhesive directly upon the lower surface of substrate layer (1)(i) as the latter emerges from the first extruder. A third extruder in association with the first extruder is supplied with the same polypropylene as the first but without the PBT to provide skin layer (1)(ii) of facing layer (1). A fourth extruder in association with the first three extruders is supplied with the same polypropylene but one containing a solventless radiation curable silicone release component (10 parts) in accordance with U.S. Pat. No. 4,070,526 to provide release layer (2). A melt coextrusion is carried out while maintaining the cylinder of the substrate material at a temperature ranging from 190° C. to 220° C.. The polypropylene to be extruded as facing layer (1) and release layer (2) is maintained at a temperature of 220oC A film structure is coextruded with a substrate layer (1)(i) thickness of 40% of the total extruded thickness. Skin layer 1(ii), the pressure sensitive adhesive layer applied thereto and release layer (2) each is approximately 20% of the total thickness. The unoriented film structure measures approximately 40 mils in thickness. This film structure is subsequently oriented seven by seven and one-half times using a commercially available sequential biaxial orientation apparatus causing void formation and opacification, the ensuing solid state crystallization of the polypropylene forcing the release agent to migrate to the upper surface thereof. The MD orientation temperature is about 105° C. and the TD orientation 135° C.. The resulting 1.9 mil coextruded pressure sensitive label stock has an opacity of 20% transmission and a 45o gloss of 120%. The composite film is then subjected to radiation curing in accordance with aforesaid U.S. Pat. No. 4,070,526. Combined substrate layer (1)(i) and skin layer (1)(ii), i.e., facing layer (1), is readily peelable from release layer (2) and shows good surface adhesion.

EXAMPLE 2

Example 1 is repeated except that in accordance with U.S. Pat. No. 4,419,410, there is further coextruded on the upper surface of release layer ARCO 9670, an ethylene-propylene copolymer containing about 3% by weight ethylene and initially free of release component. The thickness of the ethylene-propylene copolymer layer represents about 15% of the total thickness of release layer (2). Due to the presence of the ethylene-propylene copolymer film which possesses low stereoregularity compared to the highly stereoregular films to which it is applied, following biaxial orientation the curable silicone release agent preferentially migrates to the upper surface of layer (2).

EXAMPLE 3

Example 1 is substantially repeated but without the presence of PBT in substrate layer (1)(i) of facing layer (1) and using an ultraviolet-curable solventless silicone release component according to U.S. Pat. No. 4,279,717. The transparent label stock produot resulting from the coextrusion herein permits the use of such a light-curable silicone.

EXAMPLE 4

Example 2 is repeated but extruding substrate layer (1)(i) with the pressure sensitive adhesive incorporated therein and applying a coextruded layer of ethylene-propylene copolymer to the lower surface thereof to direct the migration of the adhesive to said surface following orientation.

What is claimed is:

1. A process for making an oriented polymer film product which comprises:
    (a) incorporating a solventless, curable silicone release composition into an extrudable, orientable polymer;
    (b) extruding the polymer as a sheet or film;
    (c) orienting the sheet or film such that curable silicone release composition migrates to at least one surface of the sheet or film forming a substantially continuous layer thereon; and,
    (d) subjecting the oriented sheet or film to silicone-curing conditions whereby said curable silicone release composition forms a peelable release layer thereon.

2. The process of claim 1 wherein in step (c), the film is biaxially oriented in the machine and transverse directions.

3. The process of claim 1 wherein the film is fabricated from a highly stereoregular polypropylene homopolymer.

4. The process of claim 1 wherein the film possesses a barrier layer applied to one surface thereof, said barrier layer preventing or blocking the exudation of curable silicone release composition upon said surface.

5. The process of claim 3 wherein the film possesses a relatively thin layer of polymer of comparatively low stereoregularity applied to one surface thereof, the curable silicone release composition preferentially migrating to said surface.

6. The process of claim 5 wherein the film possesses a barrier layer applied to the opposite surface thereof, said barrier layer preventing or blocking the exudation of curable silicone release composition upon said opposite sureface.

* * * * *